United States Patent
Klampfer et al.

(10) Patent No.: US 12,188,381 B2
(45) Date of Patent: Jan. 7, 2025

(54) VALVE-ACTUATING DEVICE HAVING A SWITCHING DEVICE

(71) Applicant: AVL LIST GMBH, Graz (AT)

(72) Inventors: Martin Klampfer, Hitzendorf (AT); Andreas Zurk, Weinburg (AT); Thomas Salmutter, Graz (AT)

(73) Assignee: AVL LIST GMBH, Graz (AT)

( * ) Notice: Subject to any disclaimer, the term of this patent is extended or adjusted under 35 U.S.C. 154(b) by 7 days.

(21) Appl. No.: 18/042,691

(22) PCT Filed: Aug. 24, 2021

(86) PCT No.: PCT/AT2021/060291
§ 371 (c)(1),
(2) Date: Feb. 23, 2023

(87) PCT Pub. No.: WO2022/040710
PCT Pub. Date: Mar. 3, 2022

(65) Prior Publication Data
US 2023/0332518 A1    Oct. 19, 2023

(30) Foreign Application Priority Data
Aug. 24, 2020  (AT) .............................. A 50710/2020

(51) Int. Cl.
*F01L 1/14* (2006.01)
*F01L 1/18* (2006.01)
(Continued)

(52) U.S. Cl.
CPC ................. *F01L 1/146* (2013.01); *F01L 1/18* (2013.01); *F01L 1/181* (2013.01); *F01L 1/46* (2013.01);
(Continued)

(58) Field of Classification Search
CPC ....... F01L 2001/054; F01L 1/146; F01L 1/18; F01L 2001/186; F01L 1/46; F01L 13/0036
(Continued)

(56) References Cited

U.S. PATENT DOCUMENTS 4,901,685 A   2/1990 Fukuo et al.
6,273,039 B1  8/2001 Church
(Continued)

FOREIGN PATENT DOCUMENTS

DE   102007033757        1/2009
DE   102017129422 A1 *  6/2019
(Continued)

OTHER PUBLICATIONS

Official Action with Machine Translation for Austria Patent Application No. A 50710/2020, dated Jul. 16, 2021, 3 pages.
(Continued)

*Primary Examiner* — Jorge L Leon, Jr.
(74) *Attorney, Agent, or Firm* — Sheridan Ross P.C.

(57) ABSTRACT

A valve-actuating device for a valve of a reciprocating piston engine having a coupling apparatus with a locking element able to be brought into a first and second position by a mechanical switching device, the switching device comprising a guide rod and a parallel actuating rod capable of relative movement; a slotted guide element movably mounted on the guide rod for moving the locking element; a triggering element coupled to the slotted guide element; where the slotted guide element and triggering element are clamped between two stops on the actuating rod, each with an associated spring element, where the slotted guide element and the triggering element are displaceable along and/or parallel to the guide rod with the actuating rod; and a blocking element interacting with the triggering element
(Continued)

which in a first state, blocks a displacement of the triggering element and the slotted guide element upon the axial displacing of the actuating rod such that the spring elements are preloaded, where in a second state, a displacement of the triggering element and the slotted guide element effects actuation of the coupling apparatus.

10 Claims, 8 Drawing Sheets (51) Int. Cl.
*F01L 1/46* (2006.01)
*F01L 13/00* (2006.01)
*F01L 13/06* (2006.01)
*F01L 1/047* (2006.01)

(52) U.S. Cl.
CPC ............ *F01L 13/0036* (2013.01); *F01L 13/06* (2013.01); *F01L 2001/054* (2013.01); *F01L 2001/186* (2013.01)

(58) Field of Classification Search
USPC ................. 123/90.44, 90.48, 90.61
See application file for complete search history.

(56) References Cited

U.S. PATENT DOCUMENTS

| 6,354,265 | B1 | 3/2002 | Hampton et al. | |
|---|---|---|---|---|
| 10,502,102 | B1* | 12/2019 | Hofer | F01L 1/185 |
| 11,377,984 | B2 | 7/2022 | Klampfer et al. | |
| 2005/0092269 | A1 | 5/2005 | Harmon | |
| 2008/0264370 | A1 | 10/2008 | Shewell | |
| 2010/0186691 | A1 | 7/2010 | Werler | |
| 2012/0186546 | A1 | 7/2012 | Cecur et al. | |
| 2014/0326212 | A1 | 11/2014 | Baltrucki et al. | |
| 2015/0184556 | A1 | 7/2015 | Yamada et al. | |
| 2019/0316494 | A1* | 10/2019 | Mariuz | F01L 13/0005 |
| 2020/0182108 | A1* | 6/2020 | VanWingerden | F02D 13/04 |
| 2020/0224560 | A1* | 7/2020 | Schott | F01L 1/185 |
| 2020/0271023 | A1* | 8/2020 | Raimondi | F01L 13/0005 |
| 2020/0300131 | A1* | 9/2020 | Klampfer | F01L 13/0005 |
| 2020/0318500 | A1* | 10/2020 | Cecchi | F02M 26/01 |
| 2020/0318501 | A1* | 10/2020 | Andrisani | F01L 1/185 |
| 2021/0040868 | A1* | 2/2021 | Mysak | F01L 13/00 |
| 2021/0040869 | A1* | 2/2021 | Andrisani | F01L 1/18 |
| 2021/0189917 | A1* | 6/2021 | Lorenzon | F01L 1/047 |
| 2021/0355849 | A1* | 11/2021 | Guaschino | F01L 13/0005 |
| 2023/0049929 | A1* | 2/2023 | Saggam | F01L 1/46 |
| 2023/0272728 | A1 | 8/2023 | Klampfer et al. | |

FOREIGN PATENT DOCUMENTS

| DE | 102017129553 A1 * | 6/2019 | |
|---|---|---|---|
| DE | 102018119267 A1 * | 2/2020 | |
| DE | 102018128701 A1 * | 5/2020 | |
| DE | 102018128796 A1 * | 5/2020 | |
| FR | 2969707 | 6/2012 | |
| JP | 2019124176 A * | 7/2019 | |
| WO | WO 2008/012679 | 1/2008 | |
| WO | WO 2015/022071 | 2/2015 | |
| WO | WO 2016/131728 | 8/2016 | |
| WO | WO 2017/144706 | 8/2017 | |
| WO | WO 2019/025511 | 2/2019 | |
| WO | WO-2019025511 A1 * | 2/2019 | F01L 1/146 |
| WO | WO-2019122261 A1 * | 6/2019 | |
| WO | WO 2019/133658 | 7/2019 | |
| WO | WO 2022/248082 | 12/2022 | |

OTHER PUBLICATIONS

Official Action with Machine Translation for Austria Patent Application No. A 50710/2020, dated Aug. 10, 2022, 4 pages.
International Search Report and Written Opinion for International (PCT) Patent Application No. PCT/AT2021/060291, dated Dec. 9, 2021, 11 pages.
English Translation of the International Search Report for International (PCT) Patent Application No. PCT/AT2021/060291, dated Dec. 9, 2021, 2 pages.

* cited by examiner

Fig. 13

VALVE-ACTUATING DEVICE HAVING A SWITCHING DEVICE

CROSS REFERENCE TO RELATED APPLICATIONS

This application is a national stage application under 35 U.S.C. 371 and claims the benefit of PCT Application No. PCT/AT2021/060291 having an international filing date of 24 Aug. 2021, which designated the United States, which PCT application claimed the benefit of Austria Patent Application No. A50710/2020 filed 24 Aug. 2020, the disclosures of each of which are incorporated herein by reference in their entireties.

FIELD OF THE INVENTION

The invention relates to a valve-actuating device for actuating at least one valve of a reciprocating piston engine, in particular an internal combustion engine, wherein the valve-actuating device comprises a mechanical coupling apparatus with a locking element able to be brought into at least a first and a second position by means of a switching device for actuating the coupling apparatus, wherein the valve-actuating device transmits an actuating movement for the at least one valve at least in the first position of the locking element.

BACKGROUND

Generic valve-actuating devices as well as combustion engines having such valve-actuating devices are generally known from the prior art.

Due to the ever greater demands as regards performance, efficiency and emissions, variable valve trains; i.e., valve trains with variable valve lift, are gaining ever more importance in reciprocating internal combustion engines, particularly reciprocating internal combustion engines in 4-stroke operation and 6-stroke operation.

Variable valve trains can meet the need faced by combustion engine design engineers as well as the thermodynamic aspirations in alternatively assigning different valve lift curves to one or more valves, particularly depending on the combustion engine operating situation, whereby both the valve lift as well as the opening and closing points can be adjusted.

This is generally achieved by switching the transmission path of the valve train. Various applications make series use of lift switching and lift cut-off systems with switchable cam followers such as bucket tappets, roller tappets or rocker arms. Applicable hereto is that for each additional alternative valve lift, a corresponding cam also needs to be provided as the element providing the lift-unless the alternative lift is a zero-lift.

There are different areas of application for the use of valve trains with varying or variable valve lift. Some examples are listed below:

Lift switching: Lift switching enables the operating point-dependent use of at least two different valve lifts. A smaller valve lift specifically tailored to the partial load range is used here which improves the torque curve and reduces consumption and emissions. The large valve lift can be optimized for further increased performance. A smaller valve lift of lower maximum lift and shorter period enables reducing the gas exchange work (Miller cycle) via a significantly earlier intake closing point and intake system dethrottling. Similar results are possible with the Atkinson cycle; i.e., extremely late intake closing. Optimum filling of the combustion chamber thereby still results in increased torque in the partial load range.

Cylinder cut-off: Cylinder cut-off is predominantly used in large-volume, four-cylinder engines (for example with four, eight, ten or twelve engine cylinders). Selected engine cylinders are thereby shut down by switching off the lift at the intake and exhaust valves; thereby being a complete decoupling from the cam lift. Due to equally spaced ignition sequences, common V8 and V12 motors can thereby be switched to A4 or R6 engines.

The intent of engine cylinder cut-off is that of minimizing the gas exchange losses and shifting the operating point toward higher mean pressures and thus higher thermodynamic efficiencies, thereby enabling significant fuel savings to be achieved.

Engine braking mode: Engine braking systems which enable engine braking mode are becoming increasingly important in vehicle combustion engines, particularly commercial vehicles, as they constitute cost-effective and space-saving additional braking systems able to reduce the load on the wheel brakes, particularly on longer downhill stretches. Additionally, the increase in the specific power of modern commercial vehicle engines also requires increasing the achievable braking power.

A known method of achieving an engine braking effect is providing additional macrovalves in the cylinders of a combustion engine which are capable of implementing so-called decompression braking by way of a decompression of the cylinder via the additional engine valves at the end of the compression stroke, particularly in a four-stroke engine or a six-stroke engine. The work effected on the compressed gas thereby exits via the combustion engine's exhaust system. Furthermore, the combustion engine must in turn expend work in order to refill the cylinder with gas. Known among other things is producing an engine braking effect via a variable valve train of the actual exhaust valves.

Various systems and concepts are known for varying valve lift. Known in particular is providing a mechanical or hydraulic coupling apparatus between one or more cam lift-transmitting valve-actuating elements of a valve-actuating device via which a switch in the transmission path of the valve train can be achieved.

For example, the US 2014/0326212 A1 document shows a system for variable valve timing, particularly for producing an engine braking effect, which comprises a "lost motion" device with hydraulically actuatable locking elements in order to selectively lock or unlock a valve-actuating mechanism so that valve-actuating movements will be selectively transmitted or not transmitted to one or more valves in order to vary the valve lift and thereby produce in particular engine braking.

The WO 2015/022071 A1 document discloses a valve-actuating device for actuating at least a first valve of a reciprocating piston engine, in particular an internal combustion engine, which can in particular be used for engine braking and which has a first rocker arm part, a second rocker arm part, and a first switching element for varying the valve lift of the at least one first valve, wherein the first rocker arm part and the second rocker arm part are pivotably mounted and arranged such that at least one first valve timing movement of a first camshaft can be transmitted to the at least one first valve via the first rocker arm part and the second rocker arm.

The WO 2019/025511 A1 document relates to a coupling apparatus for a valve-actuating device for actuating at least one valve of a reciprocating piston engine with variable valve lift, in particular for a valve-actuating device of a reciprocating internal combustion engine, as well as a valve-actuating device and a reciprocating piston engine, wherein the coupling apparatus comprises a first coupling element, a second coupling element and a locking device. The first coupling element and the second coupling element are displaceable relative to each other at least within defined limits along a first axis, whereby the locking device can block the relative displacement of the two coupling elements relative to one another along the first axis in at least a first direction. The locking device has a locking element able to be circumferentially rotated about the first axis at least in a defined region, wherein the relative displacement of the two coupling elements along the first axis is blocked at least in the first direction when the locking element is in a blocking position.

SUMMARY OF THE INVENTION

One task of the invention is that of providing an improved valve-actuating device for variable valve timing. A particular task of the invention is providing such a valve-actuating device with a switching device which enables precise switching between different types of valve timing.

This task is solved by a valve-actuating device and a combustion engine according to the independent claims. Advantageous developments are claimed in the dependent claims.

A first aspect of the invention relates to a variable valve-actuating device for actuating at least one valve of a reciprocating piston engine, particularly an internal combustion engine, wherein the valve-actuating device comprises a mechanical coupling apparatus having a locking element able to be brought into at least a first and a second position by means of a switching device for actuating the coupling apparatus, wherein the valve-actuating device transmits an actuating movement for the at least one valve at least in the first position of the locking element, and wherein the switching device comprises:
a guide rod, in particular in fixed mounting to the housing;
an actuating rod running substantially parallel to the guide rod and movable in its axial direction relative to the guide rod;
a slotted guide element movably mounted on the guide rod and designed to move the locking element at least from the first to the second position and vice versa;
a triggering element coupled to the slotted guide element in the axial direction of the actuating rod;
wherein the slotted guide element and the triggering element are clamped between two stops arranged on the actuating rod by means of two spring elements, each stop being allocated a respective spring element,
wherein the actuating rod is configured to displace at least the slotted guide element and the triggering element in a direction along and/or parallel to the guide rod, and
a blocking element configured to interact with the triggering element such that, in a first state, the blocking element blocks a displacement of the triggering element and the slotted guide element upon the axial displacing of the actuating rod such that at least one of the spring elements is preloaded and, in a second state, enables a displacement of the triggering element and the slotted guide element, which effects actuation of the coupling apparatus.

The locking element moves from the first to the second position and vice versa particularly by rotation.

A second aspect of the invention relates to an internal combustion engine having such a valve-actuating device.

A slotted guide element within the meaning of the invention is preferably a mechanical element by means of which a force and/or movement can be transmitted to another mechanical element, wherein due to the design of the slotted guide element, the other mechanical element can independently move in a different direction from the direction of the transmitted force or movement.

Fixed mounting to the housing within the meaning of the invention means stationary with respect to a frame of reference, in particular the valve-actuating device and/or the reciprocating piston engine.

The invention is based on the recognition that controlling a change in valve lift curve or valve timing in a combustion engine, particularly when same is time-dependent or crankshaft angle-dependent, should be as precise as possible in order for the combustion engine to be operated with optimized consumption and/or emissions and/or concurrent low wear.

The invention on the one hand achieves this by the slotted guide element, which actuates the coupling apparatus for switching between at least two different valve lift curves, and the triggering element being clamped between two stops arranged on the actuating rod by means of two spring elements. As a result, a movement induced by the actuating rod does not need to be immediately implemented by the slotted guide element but can instead be stored in the spring elements as potential energy. The exact moment of switching can therefore be made independent of the moment of actuation.

It is on the other hand achieved by the blocking element blocking a displacement of the triggering element and the slotted guide element in a first state such that at least one of the spring elements is preloaded by the movement of the actuating rod and, in a second state, enabling a displacement of the triggering element and the slotted guide element. Making use of the blocking element enables precisely dictating the point in time at which the coupling apparatus is actuated and thus the switching points. The blocking element only needs to be released. The actuating rod also only needs to be moved in one direction along its longitudinal axis or, respectively, substantially parallel to the guide rod.

Furthermore, switching a plurality of valve-actuating devices can be initiated with one actuating rod and therefore with a single actuator, whereby the individual switching events of the valve-actuating devices are offset in terms of timing or crankshaft angle. This is then particularly advantageous when the different valve-actuating devices are part of respective different cylinders which are each timed differently. Thus, the actuation of the actuating rod can initiate the switching for all the cylinders on the one hand, yet the switching is only triggered in each case by the blocking element unblocking the triggering element. Switching in low-load regions of the individual cylinders has proven particularly advantageous.

In one advantageous embodiment of the valve-actuating device, the triggering element and/or the slotted guide element is/are movably mounted on the actuating rod. The slotted guide element and/or the triggering element can thereby be mounted without additional mounting means needing to be provided to that end. This can also improve the transmission of force from the actuating rod to the triggering element and the slotted guide element.

In a further advantageous embodiment of the valve-actuating device, the actuating rod runs through the spring elements. This configuration enables the spring elements to also be mounted without any further measures. In other words, the spring elements are mounted on the actuating rod in one advantageous embodiment, whereby the spring elements are advantageously designed as spiral spring elements or elements running around the actuating rod respectively.

In a further advantageous embodiment of the valve-actuating device, the coupling apparatus further comprises a tappet, wherein the tappet is secured to the locking element and interacts with a link of the slotted guide element for displacing, in particular rotating, the locking element. Providing the tappet makes it particularly easy for the slotted guide element to actuate the coupling apparatus.

In a further advantageous embodiment of the valve-actuating device, the link movably guides the tappet in the direction of the actuating movement, whereby the link is preferably of U-profile design. A U-profile is particularly suitable for selectively fixing an element in one direction.

In a further advantageous embodiment of the valve-actuating device, the coupling apparatus furthermore comprises a first coupling element which interacts with the locking element, and wherein the first coupling element and the locking element are blocked against each other in the first position of the locking element such that the coupling apparatus stays well within a defined length in its axial direction and, in the second position of the locking element, the first coupling element and the locking element are displaceable against each other, particularly into each other, such that the coupling apparatus is axially shortened compared to the defined length. Providing the locking element enables achieving particularly simple switching of the coupling apparatus. Preferably, the locking element pivots from the first position to the second position about a longitudinal axis of the coupling apparatus and/or the first coupling element. Preferably, the tappet secured to the locking element runs substantially normal to the longitudinal axis of the coupling apparatus.

In a further advantageous embodiment of the valve-actuating device, the coupling apparatus furthermore comprises a second coupling element which is movable in the axial direction of the coupling apparatus relative to the first coupling element or the locking element and butts against the first coupling element or the locking element at least when the actuating movement is being transmitted. Since the force transmission connection is only realized by a stop, the second coupling element can lift off from the first coupling element and/or the locking element. Hence, the coupling apparatus does not have a limiting effect on externally induced movements.

In a further advantageous embodiment of the valve-actuating device, the blocking element is designed as a locking disk connected to a shaft, in particular a camshaft, in rotationally fixed manner and having a switching window in which the disk radius is reduced over a defined angular sector of the locking disk, wherein the triggering element, particularly a release pin of the triggering element, abuts against a side of the locking disk in the first state and wherein the switching window is arranged in the area of the triggering element in the second state. The locking disk has proven to be a particularly simple and less failure-prone mechanical solution for the blocking element which can moreover be directly controlled via the camshaft. In particular, an electronic control and electrical signals for actuating the blocking element are not necessary in this case.

In a further advantageous embodiment of the valve-actuating device, the triggering element is pivotable about a rotational axis running parallel to the guide rod or around the guide rod, in particular pivotable about the rotational axis at least in the locking disk's rotational direction. This can thereby prevent the blocking element from damaging the triggering element.

The features and advantages described above in respect of the first aspect of the invention also apply correspondingly to the second aspect of the invention and vice versa.

In one advantageous embodiment, the internal combustion engine has at least two cylinders, in each case with one valve-actuating device per cylinder, whereby the actuating rod runs from cylinder to cylinder and is configured to displace at least the slotted guide element and the triggering element toward the guide rod in each case. In other words, the actuating rod extends along all of the cylinders, preferably substantially parallel to a longitudinal plane of the internal combustion engine defined by the longitudinal axes of the cylinders.

BRIEF DESCRIPTION OF THE DRAWINGS

Further advantages and features of the invention yield from the following description and with reference to the figures. Shown therein at least partly schematically.

DETAILED DESCRIPTION

Figure 1:
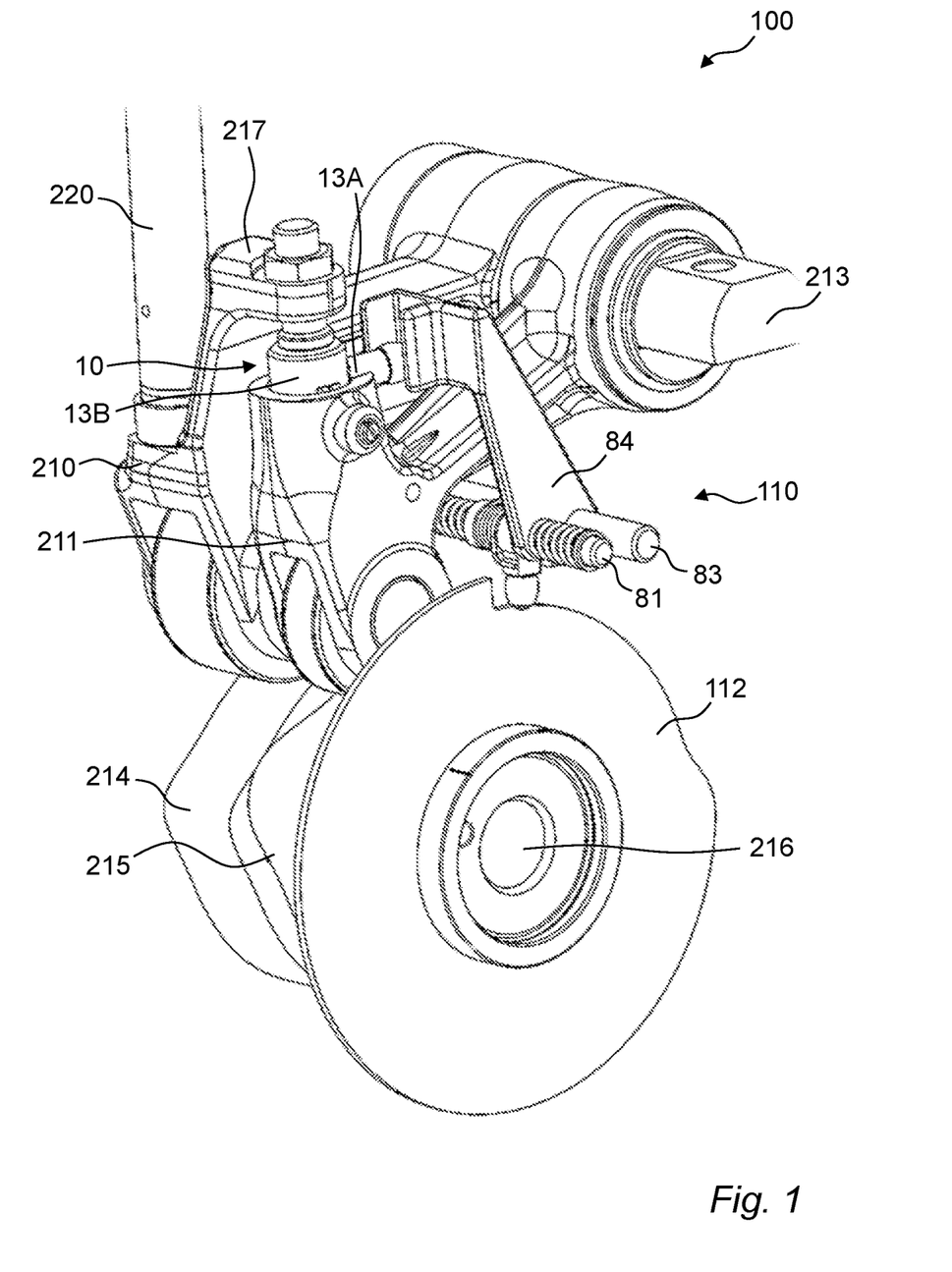
FIG. 1 a perspective view of an exemplary embodiment of a valve-actuating device.

FIG. 1 shows an exemplary embodiment of a valve-actuating device 100 in a perspective representation, wherein the valve-actuating device 100 is designed to actuate a combustion engine valve (not shown here).

In the depicted exemplary embodiment, the valve-actuating device 100 comprises a first rocker arm 210 as well as a second rocker arm 211, whereby the two rocker arms 210, 211 are rotatably mounted about a preferably common rotational axis 213. A pushrod 220 is connected, in particular operatively connected, to the first rocker arm 210 in order to transmit an actuating movement from the first rocker arm 210 and/or second rocker arm 211 to the valve. Instead of rocker arms, the invention can also be implemented with other transmission elements, e.g., rocker beams.

The first rocker arm 210 is designed to mark a contour of a first cam 214, the second rocker arm 211 is designed to mark a contour of a second cam 215. The two cams 214, 215 are rotatably mounted on an, in particular common, shaft 216. Preferably, the first cam 214 has a different contour than the second cam 215 in the circumferential direction of the shaft 216 and/or the cam lobes are circumferentially offset from one another.

The first rocker arm 210 and the second rocker arm 211 are connected together via a coupling apparatus 10. The coupling apparatus 10 is in particular configured to transmit an actuating movement from the second rocker arm 211 to the first rocker arm 210 when the coupling apparatus 10 is in a blocked state or to convert a movement of the second rocker arm 211 into a so-called lost motion movement when the coupling apparatus 10 is in an unblocked state.

In the exemplary embodiment as shown, the coupling apparatus 10 is arranged on the second rocker arm 211 or a component of the second rocker arm 211 respectively. Preferably, a longitudinal axis A (see FIG. 3) of the coupling apparatus 10, along which the length of the coupling apparatus 10 is adjustable, lies tangential to a trajectory of the second rocker arm 211 about the rotational axis 213. The longitudinal axis A substantially runs along or respectively parallel to a radial direction with respect to the shaft 216.

The first rocker arm 210 in particular has a coupling section 217 which preferably extends into the trajectory of the second rocker arm 211 and is operatively connected to the second rocker arm 211 or coupling apparatus 10 respectively for transmitting the actuating movement, for example via a second coupling element 12 (see FIG. 3) which is attachable and adjustable in the coupling section 217 via a lock nut 221.

For lengthwise adjustment, the coupling apparatus 10 preferably comprises a first coupling element 11 (not shown in FIG. 1—see e.g., FIG. 3) as well as a preferably sleeve-shaped locking element 13B. In a first position, which corresponds to the above-described unblocked state of the coupling apparatus 10, the first coupling element 11 and the locking element 13B are axially displaceable, preferably telescopically, along the longitudinal axis A of the coupling apparatus 10 relative to one another.

In order to switch the coupling apparatus 10 between the unblocked state and the blocked state, the locking element 13B can be pivoted preferably circumferentially about the longitudinal axis A of the coupling apparatus 10 and thus at least into the first position corresponding to the unblocked state and a second position corresponding to the blocked state of the coupling apparatus 10. The relative displacement of the first coupling element 11 (FIG. 3) and the locking element 13B is blocked along the longitudinal axis A and the coupling apparatus 10 is thus in the blocked state when the locking element 13B is in the first position, hereinafter referred to as the blocking position. Accordingly, when the locking element 13B is in the second position, hereinafter referred to as the unblocking position, the relative displacement of the first coupling element 11 and the locking element 13B along the longitudinal axis A is enabled, the coupling apparatus 10 thus being in the unblocked state.

The locking element 13B preferably has a radially outwardly extending tappet 13A which serves in actuating the locking element 13B by means of a switching device 110. In particular, the tappet 13A extends in the radial direction with respect to the longitudinal axis A of the coupling apparatus 10 or runs substantially normal to said longitudinal axis A respectively. Preferably, the locking element 13B forms a locking apparatus with the tappet 13A. The tappet 13A is preferably arranged so as to interact with a link 85 of a slotted guide element 84 of the switching device 110 of preferably corresponding design to tappet 13A.

The switching device 110 is thereby mounted independently of the rocker arms 210, 211 and preferably in fixed mounting to the housing of the combustion engine with the controlled valves (neither shown). The switching device 110 is preferably operated hydraulically or electromechanically by means of an actuator (not shown) and further preferably controlled by a controller (ECU) of a combustion engine.

A locking disk 112 is connected to the shaft 216 in rotationally fixed manner. As will be explained later, this serves in blocking or enabling an actuating of the coupling apparatus 10 by the switching device 110.

Figure 2:
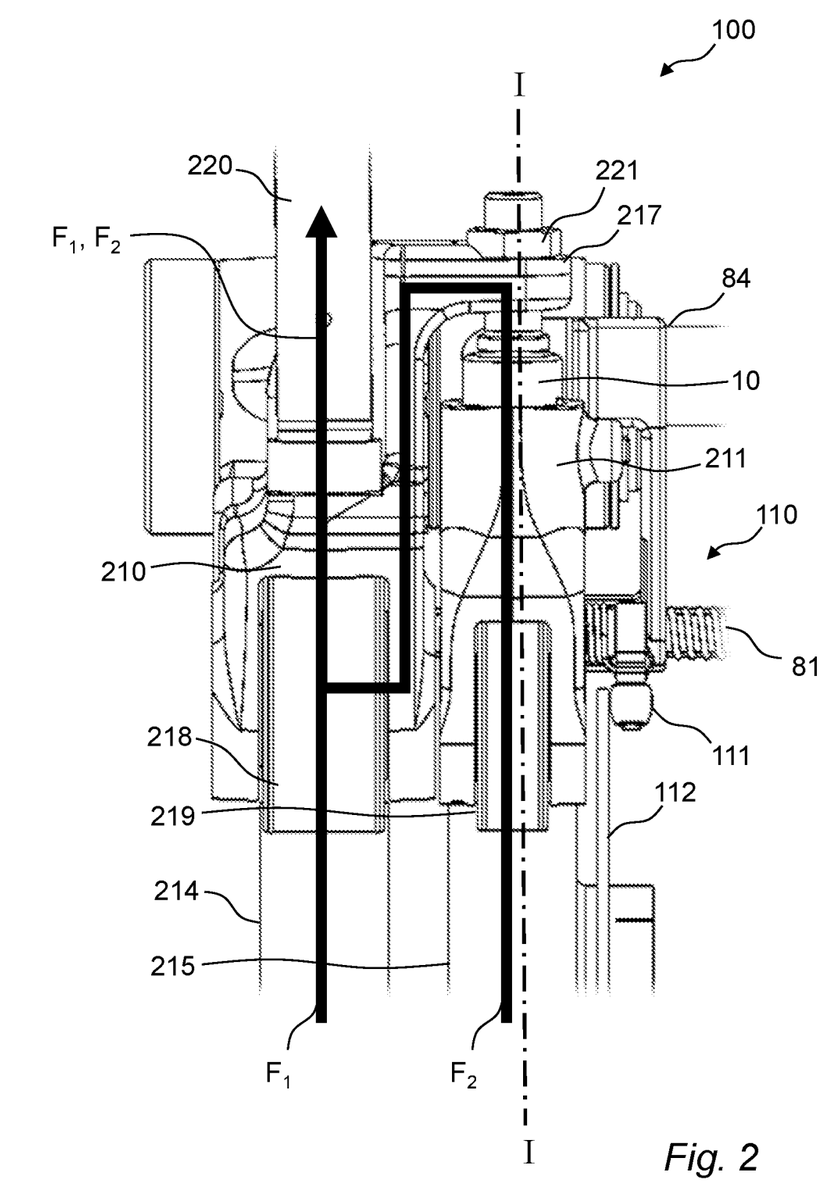
FIG. 2 a plan view of the exemplary embodiment of the valve-actuating device according to FIG. 1.

FIG. 2 shows a plan view onto the side of the valve-actuating device 100 of the exemplary embodiment according to FIG. 1 opposite from the rotational axis 213.

The first rocker arm 210 is shown on the left-hand side of the FIG. 2 illustration. A first path $F_1$ of the force transmission, depicted as a solid arrow, from the first cam 214 to the first rocker arm 210 to the pushrod 220 via a first pick-up 218 preferably runs substantially parallel to a direction of movement of the first rocker arm 210.

The second rocker arm 211 is shown on the right-hand side of FIG. 2. Force is only transmitted from the second rocker arm 211 to the first rocker arm 210 when the coupling apparatus 10 is in the blocked state. When the coupling apparatus 10 is in the blocked state, a second path $F_2$ of the force transmission from the second cam 215 and the second rocker arm 211 to the coupling apparatus 10 via a second pick-up 219 runs substantially parallel to a direction of movement of the second rocker arm 211. The second path $F_2$ of force transmission from the coupling apparatus 10 runs to the first rocker arm 210 and to the pushrod 220 preferably via coupling section 217, in particular substantially perpendicular to the movement axis of the second rocker arm 211.

It follows from the foregoing that path $F_1$ is always enabled in the embodiment as shown. Path $F_2$, on the other hand, is activated selectively depending on the state of the coupling apparatus 10.

Figure 3:
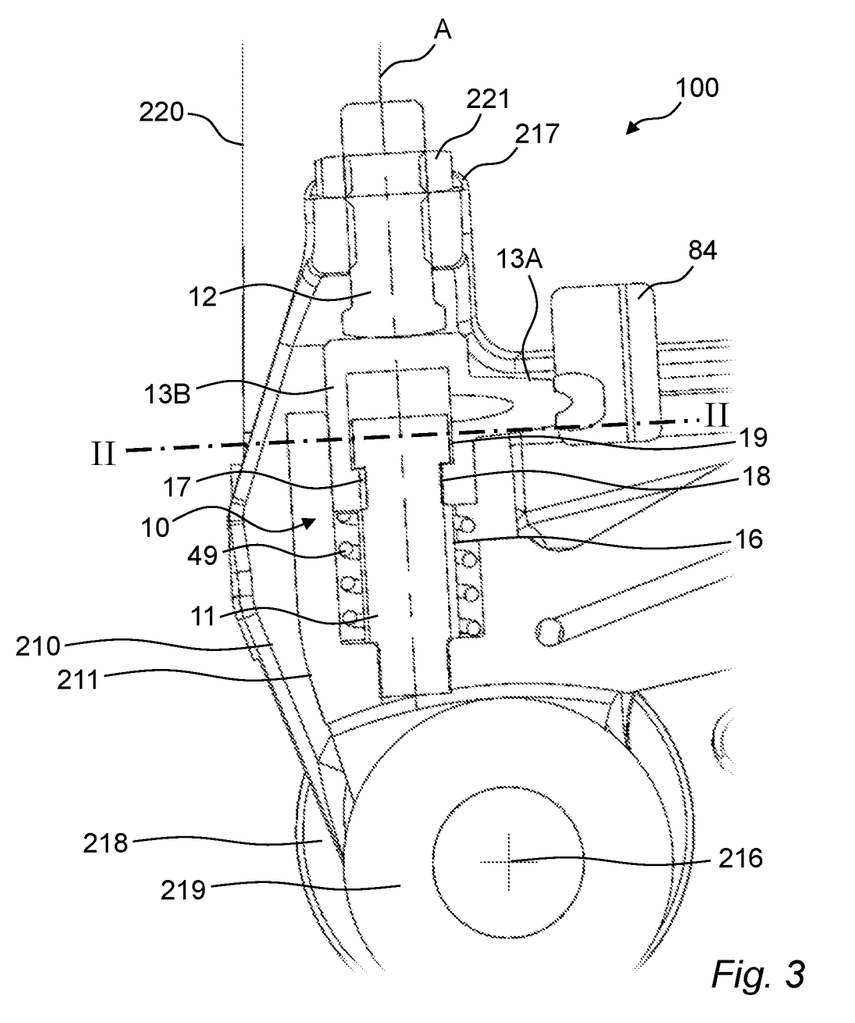
FIG. 3 a representation of a second rocker arm of the exemplary embodiment of the valve-actuating device according to FIGS. 1 and 2 in a sectional view along the I-I line in FIG. 2.

FIG. 3 shows a sectional view of an embodiment of the second rocker arm 211 of the valve-actuating device 100 in the I-I plane from FIG. 2 in which lies the central axis A of the coupling apparatus 10. As already explained to some degree with reference to FIG. 1 and now fully evident in FIG. 3, the coupling apparatus 10 comprises the first coupling element 11, the locking element 13B with tappet 13A and additionally a second coupling element 12.

The first coupling element 11 is fixed in force-transmitting manner to the second rocker arm 211, the second coupling element 12 is fixed in force-transmitting manner to the first rocker arm 210, preferably to its coupling section 217, further preferably screwed in by means of a thread and/or secured or respectively adjustable in terms of its position relative to the first coupling element 11 or the locking element 13B by a lock nut 221.

In this exemplary embodiment, the locking element 13B engages completely around the first coupling element 11; i.e., the locking element 13B is of circumferentially closed configuration in this exemplary embodiment of a coupling apparatus 10 according to the invention.

Figure 4:
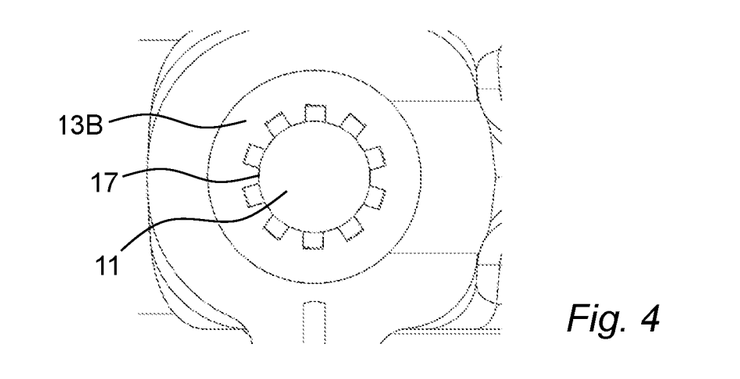
FIG. 4 a representation of a second rocker arm of the exemplary embodiment of the valve-actuating device according to FIGS. 1 and 2 in a sectional view along the II-II line in FIG. 3.

FIG. 4 shows a detail of a sectional view through the actuating device 100 in the II-II plane of FIG. 3 in the region of coupling apparatus 10. In order to be able to effect a blocking and then be able to unblock it again, the first coupling element 11 of the coupling apparatus 10 has a first section 16 with outer longitudinal toothing which extends in the longitudinal direction of the first coupling element 11 as well as a second section 18 without teeth which likewise extends in the longitudinal direction of the first coupling element 11 and directly adjoins the first section 16. Further provided is a third section 19 adjoining the second section 18 which likewise extends in the longitudinal direction of the first coupling element 11 and likewise exhibits an outer longitudinal toothing. Longitudinal toothing here means the provision of structures running substantially parallel to the longitudinal direction A of the coupling apparatus 10, for example grooves, prismatic projections or the like.

The sleeve-shaped locking element 13B has an inner longitudinal toothing 17 of corresponding design to the geometry of the first section 16 and third section 19 toothing over part of its axial length (in particular parallel to the longitudinal axis A of the coupling apparatus 10). The inner longitudinal toothing 17 only extends axially over an area of length corresponding at most to the width of the second section 18 without teeth so that the locking element 13B is rotatable about the first axis (corresponding substantially to the longitudinal axis A of the coupling apparatus 10) when the first coupling element 11 with the outer longitudinal toothing is axially displaced relative to the locking element 13B such that the inner longitudinal toothing 17 of the locking element 13B is not in engagement with the outer longitudinal toothing of the first coupling element 11 but rather is at the height of the second non-toothed section 18; i.e., between sections 16 and 19.

An outer diameter of the second non-toothed section 18 of the first coupling element 11 is thereby smaller in this coupling apparatus 10 than a tip circle diameter of the outer longitudinal toothing of the first section 16 of the first coupling element 11, whereby in particular the outer diameter of the second section 18 is smaller than or equal to the root circle diameter of the outer longitudinal toothing of the first section 16.

The outer longitudinal toothing of the third section 19 serves to improve the guiding of the first coupling element 11 in locking element 13B, wherein the toothing geometry of the outer longitudinal toothing of the third section 19 is of preferably identical design to the toothing geometry of the outer longitudinal toothing of the first section 16.

The third section 19 in this exemplary embodiment is thereby arranged directly adjacent to the second non-toothed section and at the free end of the first coupling element 11, wherein the individual teeth of the third section 19 are arranged in alignment with the teeth of the outer longitudinal toothing in the first section 16.

The locking element 13B is thereby in the blocking position when the coupling element 11 with the outer longitudinal toothing is axially displaced in the axial direction relative to the locking element 13B such that the inner longitudinal toothing 17 is not engaged with the outer longitudinal toothing of the first section 16 of the first coupling element 11 but the inner longitudinal toothing 17 of the locking element 13B is instead axially at the height of the non-toothed second section 18 and when the locking element 13B is circumferentially rotated; i.e., rotated about the first axis (corresponding to longitudinal axis A) so that at least one tooth, in particular all the teeth, of the outer longitudinal toothing of the first section 16 of the first coupling element 11 are at least partially aligned axially with at least one tooth, in particular with all the teeth, of the inner longitudinal toothing 17 of the locking element 13B, particularly such that their end faces abut one another.

A transmission of the actuating movement of the second rocker arm 211 to the first rocker arm 210 occurs when the locking element 13B is in the blocking position and a relative axial displacement of the coupling element 11 and the locking element 13B to one another is blocked. In this blocking position, the locking element 13B follows the movement of the first coupling element 11 fixedly connected to the second rocker arm and thus transmits the actuating movement of the second rocker arm 211 to the second coupling element 12.

Accordingly, the locking element 13B is in the unblocking position when the locking element 13B is rotated in the circumferential direction so that all the teeth of the outer longitudinal toothing of the first section 16 of the first coupling element 11 are arranged offset relative to all the teeth of the inner longitudinal toothing 17 of the locking element 13B such that the teeth of the outer longitudinal toothing of the first coupling element 11 engage with the teeth of the inner longitudinal toothing 17 at least over part of their axial length. A movement of the second rocker arm 211 is conversely dissipated or respectively ineffective when the locking element 13B is in the unblocking position so that the first coupling element 11 can dip into the cylinder-like section of the locking element 13B unhindered without any movement of the first coupling element 11 being transmitted to the second coupling element 12.

The locking element 13B is preferably axially braced against the second coupling element 12 by means of a spring element 49 when the locking element 13B is in the unblocking position. For improved second coupling element 12 guidance, the cylinder base of the locking element 13B is preferably curved inwardly and a free end of the second coupling element 12 is correspondingly convexly curved.

Doing so enables a defined valve lift to be selectively enabled or disabled by a mechanical switching device.

Figure 5:
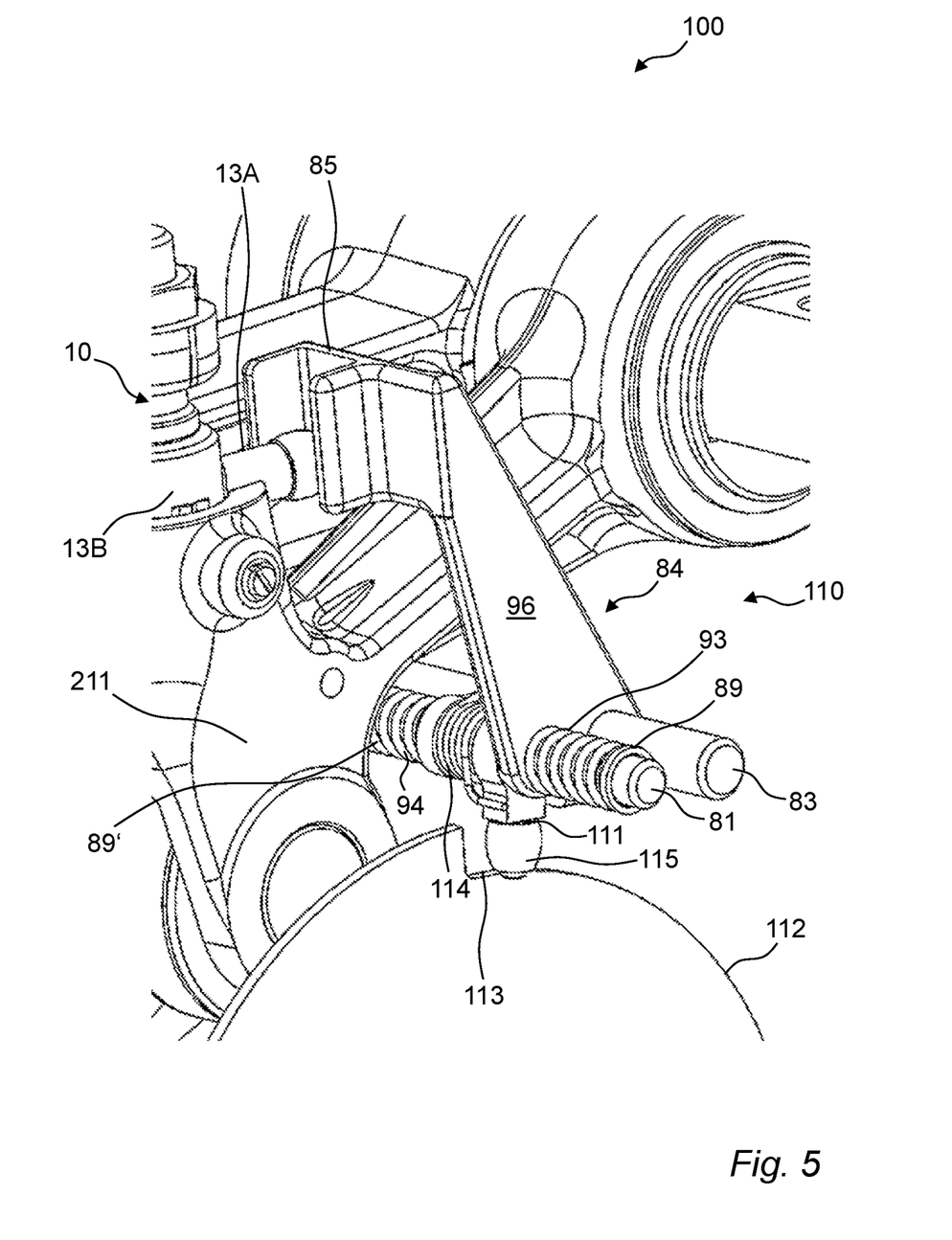
FIG. 5 a detail of an enlargement of the perspective view according to FIG. 1 of the exemplary embodiment of the valve-actuating device.

FIG. 5 shows an enlargement of the perspective representation of FIG. 1, wherein shown in particular is an embodiment of the switching device 110 of the valve-actuating device 100.

The switching device 110 comprises a slotted guide element 84 and a triggering element 111, wherein the slotted guide element 84 is configured to actuate the coupling apparatus 10. In order to cause the locking element 13B to rotate about the longitudinal axis A of the coupling apparatus 10 to that end, the tappet 13A can be displaced by means of the slotted guide element 84. The slotted guide element 84 can thereby be displaced substantially parallel to the shaft 216 (not shown in FIG. 5) and/or the rotational axis 213. To improve the interaction of the slotted guide element 84 and the locking element 13B, the slotted guide element 84 preferably has a jaw 85 on its end facing tappet 13A which is designed to interact with tappet 13A of the locking element 13B and is preferably designed in U-profile. The slotted guide element 84 is preferably movably mounted on a guide rod 83 and an actuating rod 81, the triggering element 111 mounted at least on the actuating rod 81. The longitudinal axes of the guide rod 83 and the actuating rod 81 run parallel to each other, preferably also parallel to the rotational axis 213 and to the shaft 216 but perpendicular to the actuating movement and to the longitudinal axis A of the coupling apparatus 10. The actuating rod 81 is configured to move the slotted guide element 84 on the guide rod 83.

To that end, the slotted guide element 84 and the triggering element 111 are clamped between two stops 89, 89' arranged on the actuating rod 81 (stop 89' is obscured in FIG. 5) by means of two spring elements 93, 94. The stops 89, 89' are thereby preferably designed as annular disks fixed to the actuating rod 81 in order to block an axial displacement of the spring elements 93, 94 along the longitudinal axis of the actuating rod 81 and to enable a preloading of the spring elements 93, 94 with respect to the slotted guide element 84.

Figure 6:
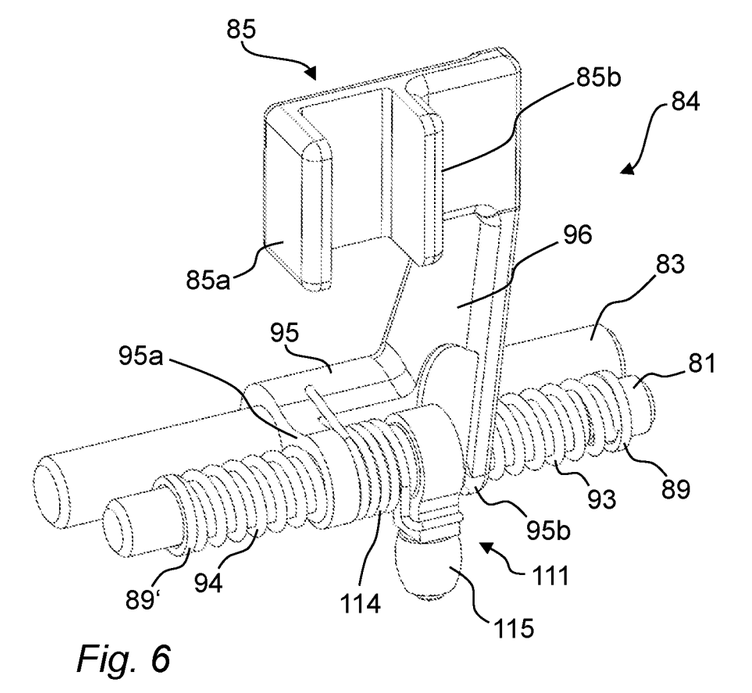
FIG. 6 a perspective detail view of a slotted guide element.
Figure 7:
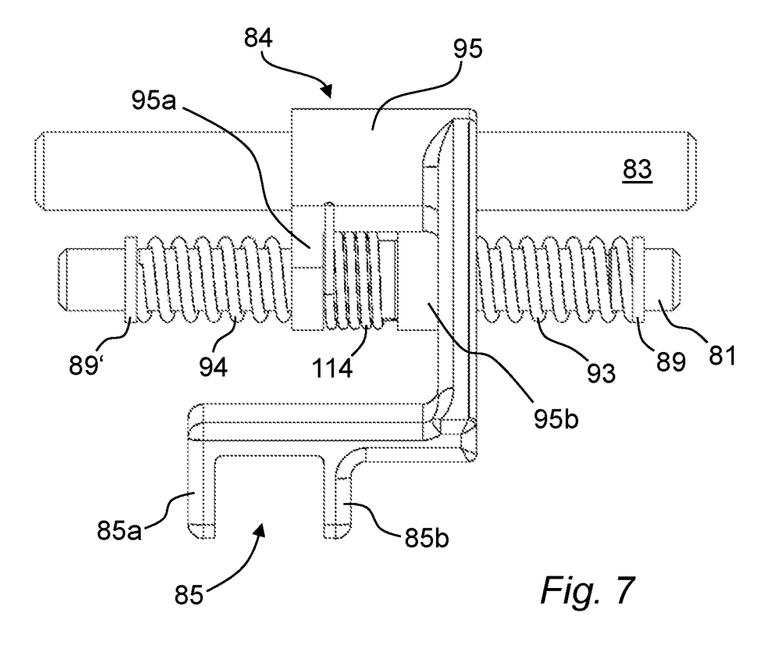
FIG. 7 a plan view of the slotted guide element according to FIG. 6.

FIG. 6 and FIG. 7 show a detail view of the slotted guide element 84. Particularly thereby recognizable is that the U-profile of the jaw 85 is substantially formed in a plane oriented normal to the longitudinal axis A of the coupling apparatus 10. This ensures the best possible encircling of the tappet 13A by the jaw 85. As used here, U-profile refers to the provision of a first jaw arm 85a and a second jaw arm 85b, these extending from a base and interacting with tappet 13A depending on the direction of movement of the slotted guide element 84 along the guide rod 83.

According to FIG. 6 and FIG. 7, the part of the slotted guide element 84 which interacts with the actuating rod 81 and guide rod 83 is also substantially U-shaped. Extending from a guide section 95 which surrounds and is movable along the guide rod 83 is a first actuating arm 95a and a second actuating arm 95b, their respective far ends from the guide rod 83 each loosely surrounding the actuating rod 81 so that the actuating rod 81 is movable relative to the actuating arms 95a, 95b or the slotted guide element 84 respectively. The actuating arms 95a, 95b on the one hand thereby serve as a respective stop for the spring elements 93, 94 so as to enable a preload in respect of the stops 89, 89'. On the other hand, the triggering element 111 likewise movable along the actuating rod is positioned with associated return spring 114 between the actuating arms 95a, 95b so that the triggering element 111 also moves when the slotted guide element 84 moves.

The guide section 95 together with actuating arms 95a, 95b is connected to the jaw 85 via a connecting section 96; preferably the guide section 95, the actuating arms 95a, 95b, the jaw 85 and the connecting section 96 are an integral structure. The connecting section 96 starts from the second actuating arm 95b in the depicted exemplary embodiment; other implementations are also possible.

The switching device 110 comprises a blocking element 112 which is designed to interact with the triggering element 111 so as to block or enable axial displacement of the slotted guide element 84. The blocking element 112 in the depicted embodiment is—as already described above—configured in the form of a locking disk. Reference numeral 112 is therefore used for the blocking element and for the locking disk in the following, respectively in general. The locking disk 112 is mounted on the shaft 216 axially offset to the first and second cam 214, 215 and can thus be rotated in sync with the two cams 214, 215.

The triggering element 111 of the depicted embodiment has a release pin 115 in radially projecting arrangement from the actuating rod 81 and capable of interacting with the locking disk 112. The release pin 115 or the entire triggering element is preferably pivotably mounted about the actuating rod 81 and further preferably held in a defined arrangement in relation to the slotted guide element 84 by a return spring 114. A defined arrangement is to be understood here particularly as the direction in which the release pin 115 protrudes radially from the actuating rod 81.

In a first position, the release pin 115 is arranged on a first side of the locking disk 112 opposite from the coupling apparatus 10. Preferably, the release pin 115 is configured so as to be able to roll along the locking disk 112 rotating with the shaft 216 when needed.

When the actuating rod 81 is axially displaced toward the coupling apparatus 10 to switch the switching device 110, the release pin 115 locks on the locking disk 112. This thus also blocks displacement of the triggering element 111 and slotted guide element 84 along the actuating rod 81 or guide rod 83 respectively. A first spring element 93, which is arranged on the side of the slotted guide element 84 opposite from the coupling apparatus 10, is thereby preloaded.

The locking disk 112 has a switching window 113 in the form of a void on its outer circumference. The switching window 113 is designed such that the triggering element 111, in particular the release pin 115, can pass through the switching window 113 when the switching window 113 situates in the region of the release pin 115 upon the locking disk 112 rotating about shaft 216. The longitudinal extension of the switching window 113 along the circumference of the locking disk 112 thus defines a window of time in which actuation of the coupling apparatus 10 by the switching device 110 is possible.

The triggering element 111, in particular the release pin 115, passing through the switching window 113 in consequence of the preloading of the first spring element 93 enables a displacement of the triggering element 111 and the slotted guide element 84. The triggering element 111 and the slotted guide element 84 are then axially displaced along the actuating rod 83, here in the direction of the coupling apparatus 10. The axial displacement of the slotted guide element 84 effects a rotational movement of the locking element 13B, in particular via tappet 13A, and thus shifts the locking element 13B from a blocking position into an unblocking position or vice versa.

In a second position, the release pin 115 is arranged on a second side of the locking disk 112 facing the coupling apparatus 10. When the actuating rod 81 axially displaces away from the coupling apparatus 10, the release pin 115 locks on the locking disk 112 inasmuch as it encounters the locking disk 112 outside of the switching window 113. An axial displacement of the triggering element 111 and the slotted guide element 84 along the actuating rod 81 or guide rod 83 respectively is thus blocked. A second spring element 94 arranged on the side of the slotted guide element 84 facing the coupling apparatus 10 is thereby preloaded.

Figures 8, 9, 10:
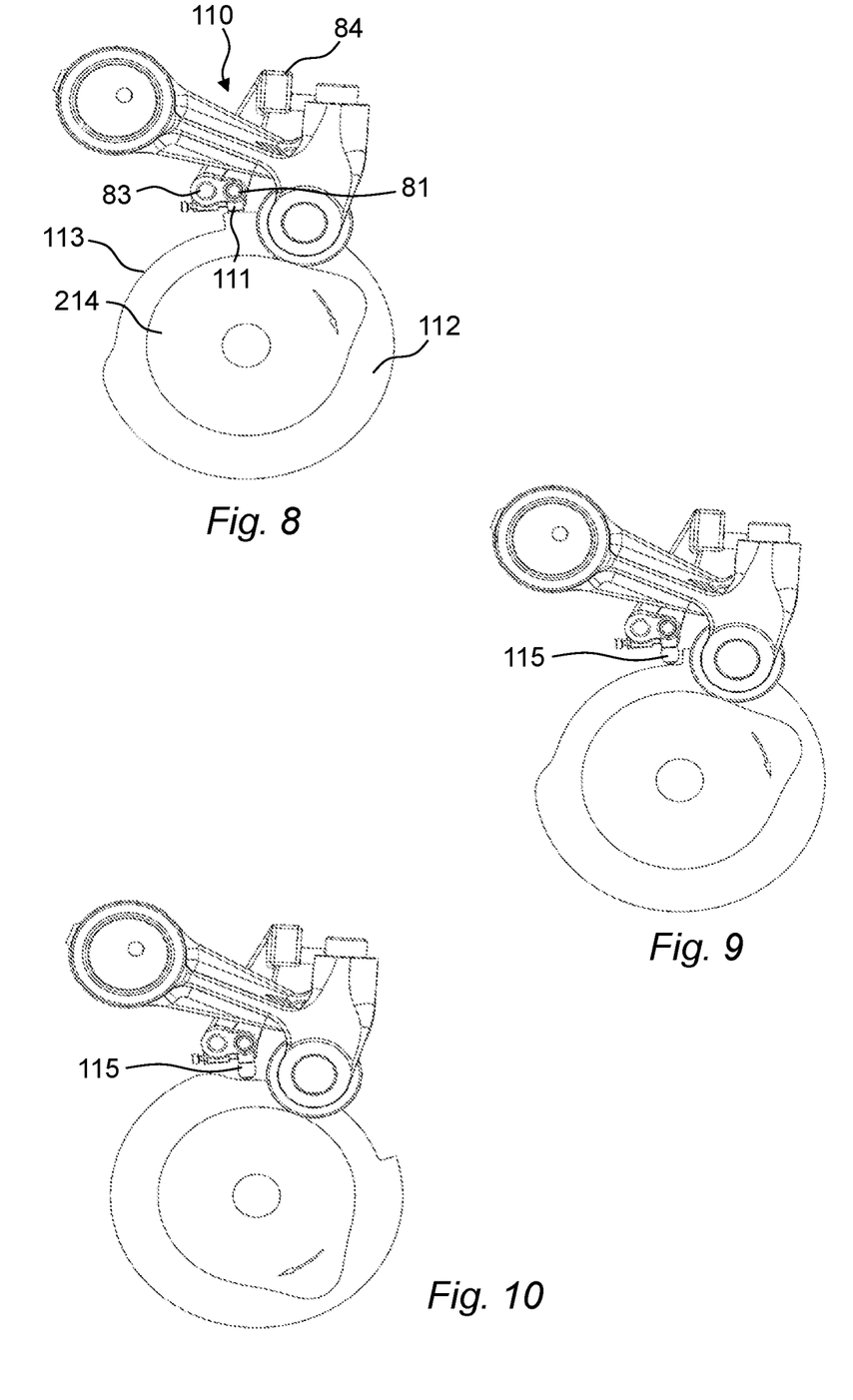
FIG. 8 a further plan view of the exemplary embodiment of the valve-actuating device according to FIGS. 1 and 2 in a first state.
FIG. 9 the plan view of FIG. 8 of the exemplary embodiment of the valve-actuating device according to FIGS. 1 and 2 at the start of a switching window in a second state.
FIG. 10 the plan view of FIGS. 8 and 9 of the exemplary embodiment of the valve-actuating device according to FIGS. 1 and 2 at the end of a switching window in a second state.

The triggering element 111, in particular the release pin 115, passing through the switching window 113 in consequence of the preloading of the second spring element 94 enables a displacement of the triggering element 111 and the slotted guide element 84. The triggering element 111 and the slotted guide element 84 are then axially displaced on the actuating rod 83, here in the direction away from the coupling apparatus 10. The axial displacement of the slotted guide element 84 effects a rotational movement of the locking element 13B, in particular via tappet 13A, and thus switches the locking element 13B from a blocking position into an unblocking position or vice versa. FIGS. 8 to 10 show a further plan view of the exemplary embodiment of the valve-actuating device along rotational axis 213 or shaft 216 respectively, which in each case runs normal to the plane of the page, whereby the plan view is this time from the side opposite from the slotted guide element 84. The release pin 115 is thereby either in the first position (FIG. 8, obscured by the locking disk 112) or in the second position (FIGS. 9 and 10). These figures will be referenced in describing a switching process by the switching device 110.

In FIG. 8, the release pin 115 is in the first position. Since the actuating rod 81 determines a switching of the switching device 110, a force is exerted via the spring elements (not shown) on the triggering element 111, and thus release pin 115, in order to get to the second position. Since the locking disk 112 blocks a displacement of the release pin 115, and thus triggering element 111 and slotted guide element 84, the release pin 115 abuts against the locking disk 112, whereby a roller attached to the release pin 115 rolls along a non-visible side of the locking disk 112 rotating together with the first cam 214.

When the release pin reaches the void or respectively switching window 113 of the locking disk 112, the release pin 115 passes through the void 113 and reaches the second position. The triggering element 111 and the slotted guide element 84, which is coupled to the triggering element 111, are displaced on the guide rod 83 and the actuating rod 81 with the release pin 115. This state is depicted in FIG. 9.

In FIG. 10, cam 214 and locking disk 112 have rotated further so that the release pin has reached the end of the switching window 113 void. The release pin 115 should be in the second position at this point and then begins to roll along on the visible side of the locking disk 112. The triggering element 111 and the slotted guide element 84 are then blocked and both can be pretensioned again by the actuating rod 81, this time in the opposite direction.

However, at the end of the switching window 113 void, there is a risk of the flank of the locking disk 112 subjecting the release pin to a load in the rotational direction of the locking disk 112 when it is in an intermediate position between the first and second position, and it breaking off as a result.

This is prevented by the pivotable mounting of the release pin 115 or the entire triggering element 111, particularly against the force of the return spring 114. Preferably, as shown in the figures, the triggering element 111 is to that end pivotably mounted on the actuating rod 81. The return spring 114 always returns the release pin 115 back to its original position.

Figure 11:
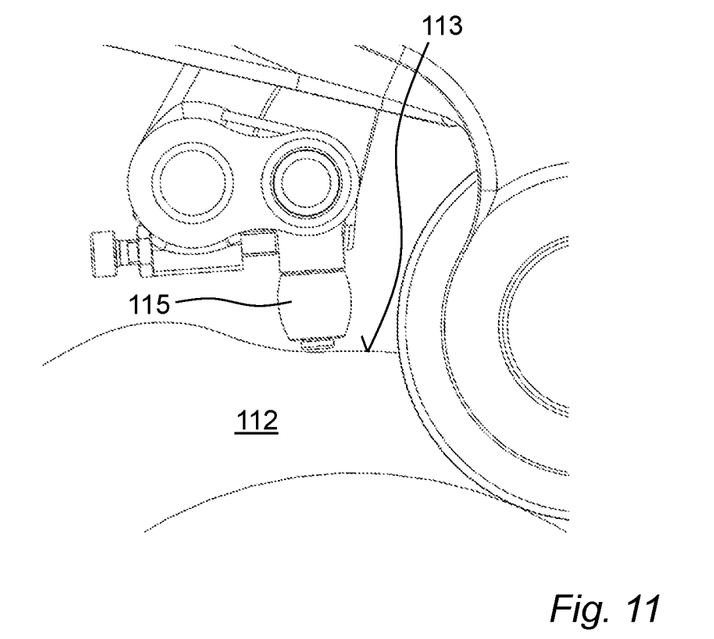
FIG. 11 an enlarged plan view of the exemplary embodiment of the valve-actuating device according to FIGS. 1 and 2 at the end of a switching window in a second state.
Figure 12:
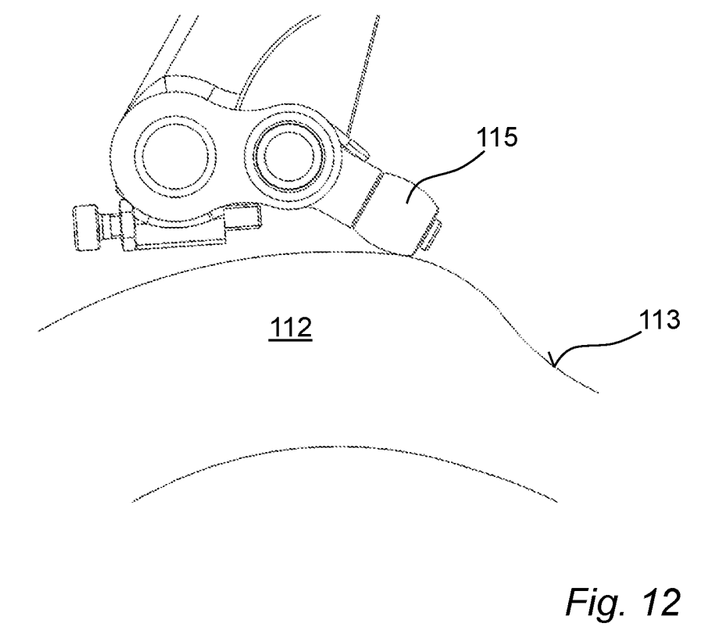
FIG. 12 an enlarged plan view of the exemplary embodiment of the valve-actuating device according to FIGS. 1 and 2 after the switching window.

As shown in even further enlarged depiction in FIG. 11 and FIG. 12, the release pin 115 can pivot away should it encounter the flank of the void, or respectively switching window 113, due to a misalignment. When the triggering element 111 finally reaches the second position, it is pivoted back again by a force provided by the return spring 114 (not shown in FIG. 11 and FIG. 12).

Figure 13:
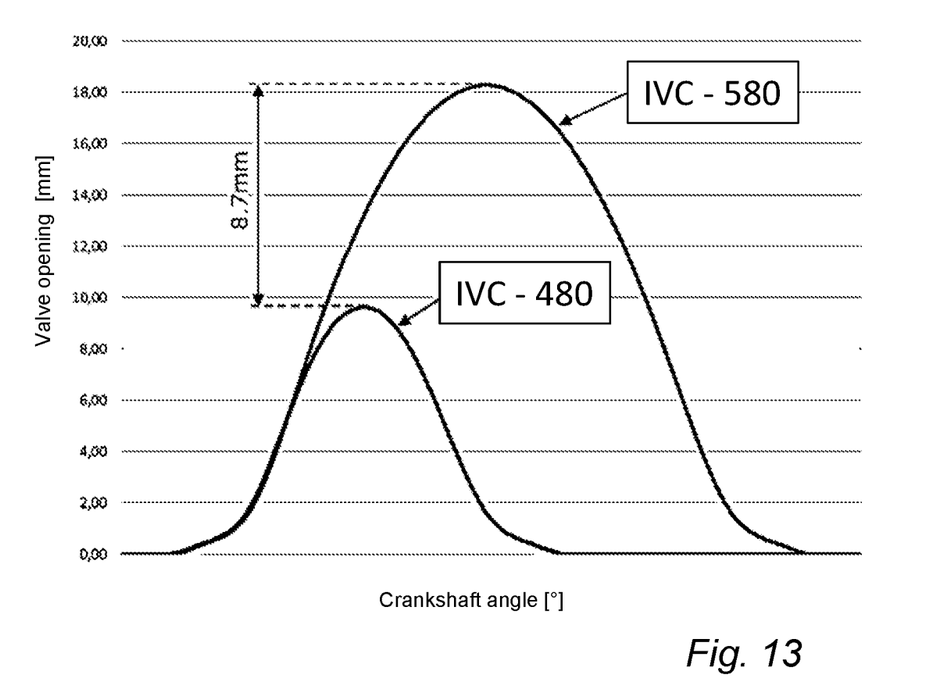
FIG. 13 an exemplary embodiment of two different valve lift curves able to be realized with the valve-actuating device according to FIGS. 1 and 2.

FIG. 13 shows an exemplary embodiment of two different valve lift curves able to be realized with the valve-actuating device 100 according to FIGS. 1 and 2. A valve opening is thereby given as a function of the crankshaft angle.

The IVC-480 valve lift curve is from a Miller cycle and is produced by the first cam 214, thus a so-called Miller cam, in the exemplary embodiments of the valve-actuating device 100 shown in the previous figures.

While operation of a combustion engine in Miller operation is particularly optimized in terms of consumption, it cannot be started in Miller operation because the cylinder fill is too low.

The IVC-580 valve lift curve belongs to a different combustion cycle in which the valves are both open for longer as well as have a larger valve lift of 8.7 mm more than the Miller cycle shown. This IVC-580 valve lift curve is produced by the second cam 215. The IVC-580 valve lift curve therefore overlaps the IVC-480 valve lift curve.

As indicated in FIG. 13, the rise in the IVC-580 valve lift curve is chronologically subsequent to the rise in the IVC-480 valve lift curve. This thereby ensures that a large part of the forces occurring in the valve-actuating device 100 when the valves are opened is transmitted via the more stable rigid first rocker arm 210 (force flow $F_1$). Only about a third of the forces then act on the variable or adjustable rocker arm 211. It can therefore be of less strong design and of smaller dimensions, in particular narrower.

Accordingly, a flank of the second cam 215 rises later than the flank of the first cam 214 with respect to an operational direction of rotation of the shaft 216. As a result, an actuating movement of the first rocker arm 210 is effected at a different, preferably earlier, point in time than an actuating movement of the second rocker arm 211. The combustion engine, in particular a so-called large engine, is preferably operated in the Miller cycle for more than 90% of the operating period. The IVC-580 valve lift curve is preferably only used when starting and when in transient sail mode (also called coasting mode).

It should be noted that the exemplary embodiments described above are only examples which are in no way intended to limit the scope of protection, application and configuration. Rather, the foregoing description is to provide the person skilled in the art with a guideline for implementing at least one exemplary embodiment, whereby various modifications can be made, particularly as regards the function and arrangement of the described components, without departing from the scope of protection resulting from the claims and from equivalent combinations of features. In particular, the valve-actuating device can also be a cam follower or a rocker or similar device. The switching device can moreover be of different configuration, in particular according to the variants shown in document WO 2019/025511 A1.

LIST OF REFERENCE NUMERALS 10 coupling apparatus
11 first coupling element
12 second coupling element
13A tappet
13B locking element
16 first section of first coupling element 11
17 inner longitudinal toothing of sleeve-shaped locking element 13B
18 second section of first coupling element 11
19 third section of first coupling element 11
81 actuating rod
83 guide rod
84 slotted guide element
85 link, jaw, U-profile
85*a* first jaw arm
85*b* second jaw arm
89 stop
93, 94 spring element
95 guide section
95*a* first actuating arm
95*b* second actuating arm
100 valve-actuating device
110 switching device
111 triggering element
112 blocking element
113 switching window
114 protective-return spring
115 release pin
210 first rocker arm 211 second rocker arm
213 rotational axis
214 first cam
215 second cam
216 shaft
217 coupling section
218 first pick-up
219 second pick-up
220 pushrod
221 lock nut
A longitudinal axis of coupling apparatus 10
$F_1$ first force transmission path
$F_2$ second force transmission path

What is claimed is:

1. A valve-actuating device for actuating at least one valve of a reciprocating piston engine, the valve-actuating device comprising:
    a mechanical coupling apparatus including a locking element configured to be switched between at least a first position and a second position, the mechanical coupling apparatus configured to transmit an actuating movement to the at least one valve when the locking element is in the first position;
    a switching device configured to alternately actuate the locking element into the first position and the second position, the switching device comprising:
        a guide rod;
        an actuating rod extending parallel to the guide rod, the actuating rod configured to move relative to the guide rod in an axial direction of the actuating rod, the actuating rod including a first stop and a second stop;
        a first spring element and a second spring element pressed between and respectively associated with the first and second stops;
        a slotted guide element slidably mounted on the guide rod and the actuating rod, the slotted guide element configured to engage the locking element so as to switch the locking element between the first position and the second position; and
        a triggering element coupled to the slotted guide element in so as to collectively slide with the slotted guide element relative to the guide rod and the actuating rod along the axial direction of the actuating rod, the triggering element and the slotted guide element being collectively pressed between the first and second spring elements; and
    a blocking element configured to:
        in a first state, block the collective sliding of the triggering element and the slotted guide element relative to the guide rod as the actuating rod moves in the axial direction such that at least one spring element of the first and second spring elements is preloaded, and,
        in a second state, enable the collective sliding of the triggering element and the slotted guide element relative to the guide rod and the actuating rod via the at least one spring element so as to effect actuation of the mechanical coupling apparatus,
    wherein the mechanical coupling apparatus further includes a tappet secured to the locking element, the tappet configured to interact with a link of the slotted guide element so as to displace the locking element.

2. The valve-actuating device according to claim 1, wherein the actuating rod runs through the first and second spring elements.

3. The valve-actuating device according to claim 1, wherein the link movably guides the tappet in a direction of the actuating movement.

4. The valve-actuating device according to claim 1, wherein the mechanical coupling apparatus further includes a first coupling element configured to switch between:
    a locked position in which the first coupling element axially engages the locking element so as to transmit the actuating movement to the at least one valve; and
    an unlocked position in which the locking element absorbs axial movement of the first coupling element.

5. The valve-actuating device according to claim 4, wherein the mechanical coupling apparatus further includes a second coupling element configured to move in an axial direction of the locking element so as to abut against the first coupling element or the locking element when the actuating movement is being transmitted.

6. The valve-actuating device according to claim 1, wherein the blocking element is a locking disk rotationally fixed to a shaft, the locking disk including a switching window in which a radius of the locking disk is reduced over a defined angular sector of the locking disk,
    wherein the triggering element abuts against a side of the locking disk when the locking disk is in the first state, and
    wherein the triggering element is aligned with the switching window when the locking disk is in the second state.

7. The valve-actuating device according to claim 6, wherein the triggering element is configured to rotate about the guide rod or a rotational axis running parallel to the guide rod.

8. An internal combustion engine comprising the valve-actuating device according to claim 1.

9. An internal combustion engine comprising a plurality of cylinders, each cylinder including a valve-actuating device according to claim 1,
    wherein the actuating rod is a common actuating rod, and the guide rod is a common guide rod, shared by each valve-actuating device, and
    wherein the common actuating rod is configured to collectively displace the slotted guide element and the triggering element of each valve-actuating device along the common guide rod.

10. A valve-actuating device for actuating at least one valve of a reciprocating piston engine, the valve-actuating device comprising:
    a mechanical coupling apparatus having including a locking element configured to be switched between at least a first position and a second position, the mechanical coupling apparatus, configured to transmit an actuating movement to the at least one valve when the locking element is in the first position;
    a switching device configured to alternately actuate the locking element into the first position and the second position, the switching device comprising:
        a guide rod;
        an actuating rod extending parallel to the guide rod, the actuating rod configured to move relative to the guide rod in an axial direction of the actuating rod, the actuating rod including a first stop and a second stop;
        a first spring element and a second spring element pressed between and respectively associated with the first and second stops;
        a slotted guide element slidably mounted on the guide rod and the actuating rod, the slotted guide element configured to engage the locking element so as to switch the locking element between the first position and the second position; and a triggering element coupled to the slotted guide element in so as to collectively slide with the slotted guide element relative to the guide rod and the actuating rod along the axial direction of the actuating rod, the triggering element and the slotted guide element being collectively pressed between the first and second spring elements; and a locking disk rotationally fixed to a shaft, the locking disk including a switching window in which a radius of the locking disk is reduced over a defined angular sector of the locking disk, the locking disk configured to;

in a first state, block the collective sliding of the triggering element and the slotted guide element relative to the guide rod as the actuating rod moves in the axial direction such that at least one spring element of the first and second spring elements is preloaded, and in a second state, enable the collective sliding of the triggering element and the slotted guide element relative to the guide rod and the actuating rod via the at least one spring element so as to effect actuation of the mechanical coupling apparatus, wherein the triggering element abuts against a side of the locking disk when the locking disk is in the first state, and wherein the triggering element is aligned with the switching window when the locking disk is in the second state.

* * * * *